(12) United States Patent
Oberbeck et al.

(10) Patent No.: US 6,746,082 B2
(45) Date of Patent: Jun. 8, 2004

(54) ACTUATION DEVICE FOR VEHICLE SEATS

(75) Inventors: Ralf Oberbeck, Wunstorf (DE); Frank Remmers, Hohnhorst (DE)

(73) Assignee: Faurecia Autositze GmbH & Co. KG, Stadhagen (DE)

( * ) Notice: Subject to any disclaimer, the term of this patent is extended or adjusted under 35 U.S.C. 154(b) by 0 days.

(21) Appl. No.: 09/982,222

(22) Filed: Oct. 18, 2001

(65) Prior Publication Data

US 2002/0070595 A1 Jun. 13, 2002

(30) Foreign Application Priority Data

Dec. 9, 2000 (DE) .......................... 100 61 364

(51) Int. Cl.[7] .................................. B60N 2/02
(52) U.S. Cl. .................. 297/362; 297/361.1; 297/364
(58) Field of Search ............... 297/362, 361.1, 297/356, 357, 367, 364; 74/353, 354, 384, 405

(56) References Cited

U.S. PATENT DOCUMENTS

| | | | | |
|---|---|---|---|---|
| 4,294,488 A | * | 10/1981 | Pickles | 297/367 |
| 4,736,986 A | * | 4/1988 | Kato et al. | 297/367 |
| 5,322,346 A | * | 6/1994 | Notta et al. | 297/367 |
| 5,590,932 A | * | 1/1997 | Olivieri | 297/367 |
| 5,813,725 A | * | 9/1998 | Robinson | 297/367 |
| 6,145,930 A | * | 11/2000 | Su | 297/367 |
| 6,371,557 B1 | * | 4/2002 | Holloway | 297/367 |

FOREIGN PATENT DOCUMENTS

EP 367096 A2 * 5/1990 ............ B60N/2/22

* cited by examiner

*Primary Examiner*—Peter M. Cuomo
*Assistant Examiner*—Sarah C. Burnham
(74) *Attorney, Agent, or Firm*—Bourque & Associates, P.A.

(57) ABSTRACT

A device to actuate a drive gear of an adjustment mechanism of a vehicle seat includes a stepped switching mechanism manually operable in two directions by means of a swiveling lever that is rotationally connected with the drive gear in order to rotate it. The rotational connection between the stepped switching mechanism and the drive gear is releasable to facilitate a greater range of seat back adjustment.

19 Claims, 5 Drawing Sheets

ACTUATION DEVICE FOR VEHICLE SEATS

FIELD OF THE INVENTION

The invention relates to a device that allows both quick and convenient adjustment of a seat back position relative to a seat bottom over a long adjustment path as well as fine-stepped adjustment.

BACKGROUND OF THE INVENTION

In a device of the type disclosed in DE 198 55 004 A1, for adjustment of a seat back, a stepped switching mechanism with a self-limiting drive actuated by a swiveling lever is constantly engaged. Various drives allow the adaptation to various adjustment conditions. When elements of a vehicle seat are displaced by small adjustment steps, the stepped switching mechanism must be actuated unnecessarily often to achieve large displacement. Actuation along long adjustment paths is thus inconvenient and time-consuming.

SUMMARY OF THE INVENTION

Based on this state of the art, it is the task of the invention to create a device of the known type so that it allows both quick and convenient adjustment of a seat back position relative to a seat bottom over a long adjustment path as well as fine-stepped adjustment.

The adjustment of a vehicle seat can be accomplished with or without a stepped switching mechanism. The mechanism connecting the stepped switching mechanism with the adjustment device is simple and inexpensive.

The invention features a device to actuate a drive gear of an adjustment mechanism of a seat with a switching mechanism manually operable in two directions by means of a swiveling lever that is rotationally connected with said drive gear in order to rotate it. A release mechanism provides a releasable rotational connection between the switching mechanism and the drive gear, for providing a rotating connection between the switching mechanism and the drive gear. In a preferred embodiment, an intermediate gear is provided between the switching mechanism and the drive gear. Providing an intermediate gear also promotes positive actuation Separation of the drive gear and the switching mechanism may be provided by means of a stepped switching mechanism swiveling lever that can be actuated without the exertion of a large actuation force. The lever may include the release mechanism.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
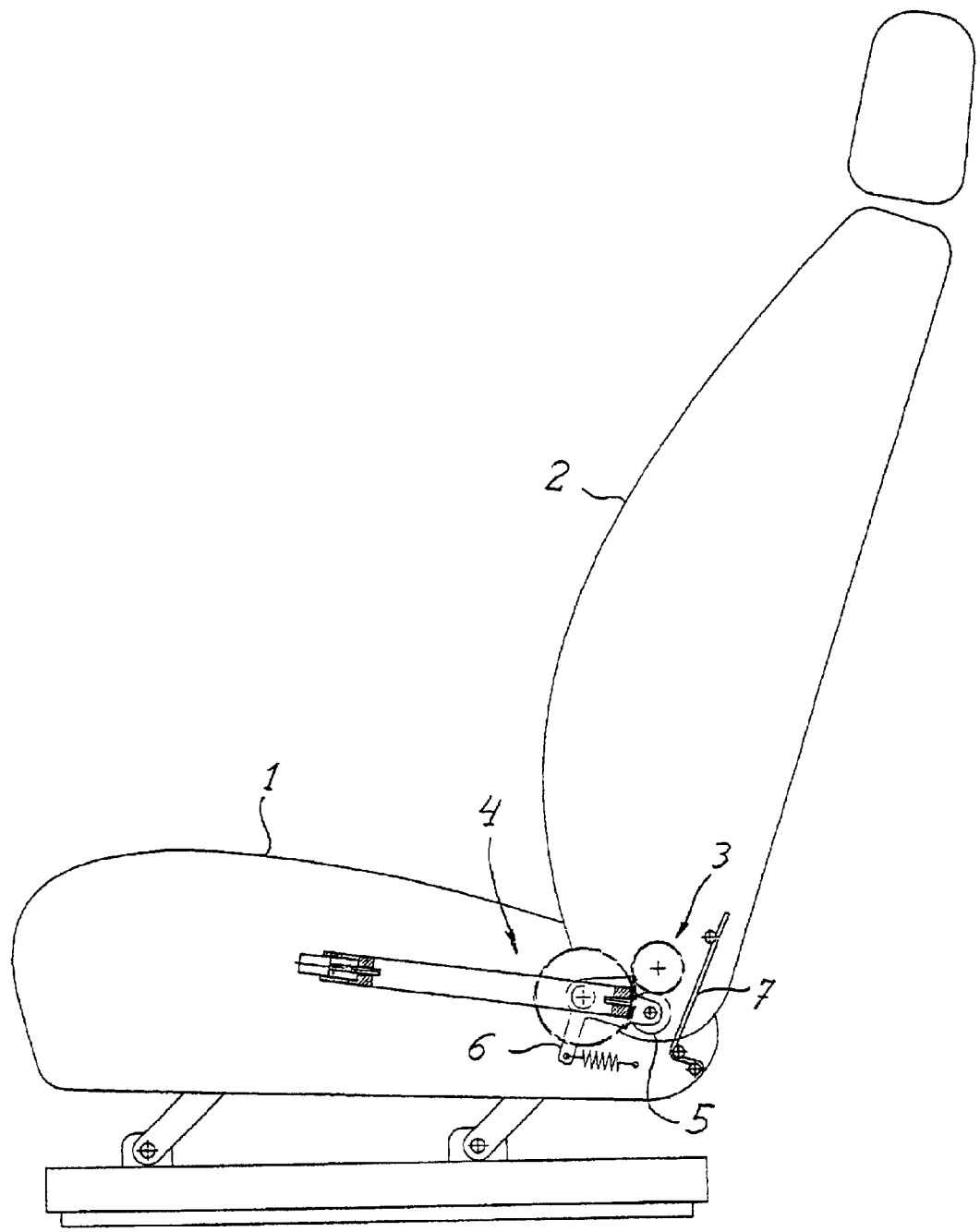
FIG. 1 is a schematic side view of a vehicle seat with a tilt adjustment mechanism and an actuation device for the seat back according to the present invention.

In the figures, the same parts receive the same reference designations, and are distinguished from one another using apostrophes as necessary.

A seat back 2 is mounted to a seat body 1 so that it may swivel about a horizontal tilt axis 3b. The tilt of the seat back 2 may be adjusted by means of an adjustment device 3. The adjustment device 3 is driven manually by an actuation device 4 via an intermediate gear 5. The actuation device 4 includes a well known stepped switching mechanism 4c that is not shown in detail in the Figures.

The intermediate gear 5 is mounted on a swing lever 6 that is free to rotate about a rotation axis 4b of the stepped switching mechanism 4c. The seat back 2 is pre-tensioned along the direction of vehicle travel by a spring 7 mounted on the seat body 1.

The stepped switching mechanism 4c includes a drive take-off gear 4d that is constantly engaged with the intermediate gear 5. The stepped switching mechanism 4c offers adjustment movements in opposing directions. It is operated exclusively by a swiveling lever 4a. Drive forces from the adjustment mechanism 3 acting in response on the stepped switching mechanism 4c will not cause displacement of the stepped switching mechanism 4c even when the swiveling lever 4a is in the neutral central setting.

Figure 2:
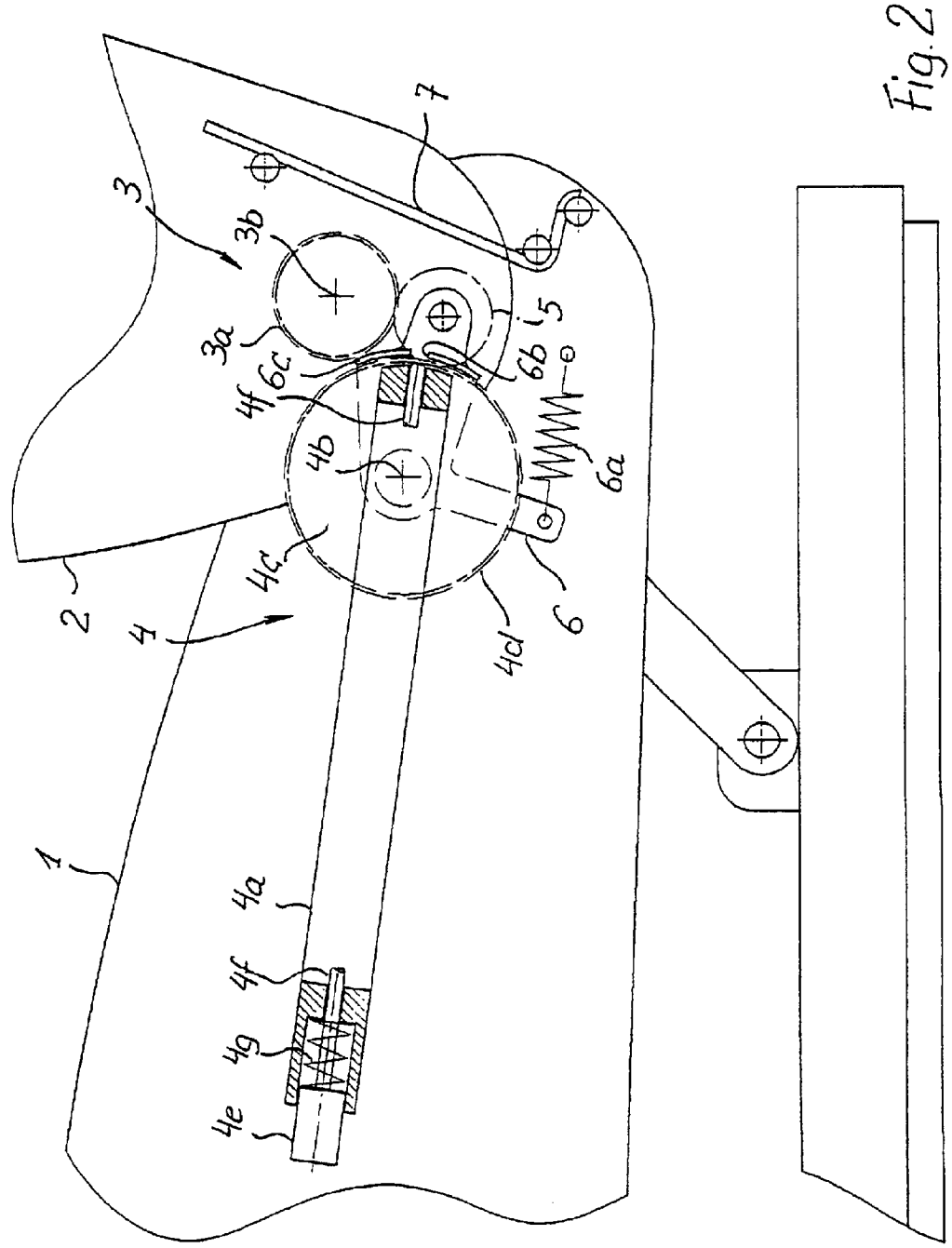
FIG. 2 is an enlarged side view of an adjustment mechanism and an actuation device as shown in FIG. 1 in its initial position.

The swiveling lever 4a is mounted free to rotate about the same swivel axis 4b as the swing lever 6. The free end of the swiveling lever 4a includes an operation button 4e that acts on a linkage rod 4f mounted along the longitudinal central plane of the swiveling lever 4a. When the swiveling lever 4a is in its central position as shown in FIG. 2, the opposite end of the linkage rod 4f is positioned opposite an aperture 6b. This aperture 6b is provided in an arc-shaped crosspiece 6c surrounding the drive take-off gear 4d that is formed on the swing lever 6.

The linkage rod 4f is held away from the aperture 6b via a pressure spring 4g. A spring 6a grips the swing lever 6 with one end, while the other end rests on the seat body 1. The spring 6a holds the intermediate gear 5 in contact with a drive gear 3a of the adjustment mechanism 3.

Figure 3:
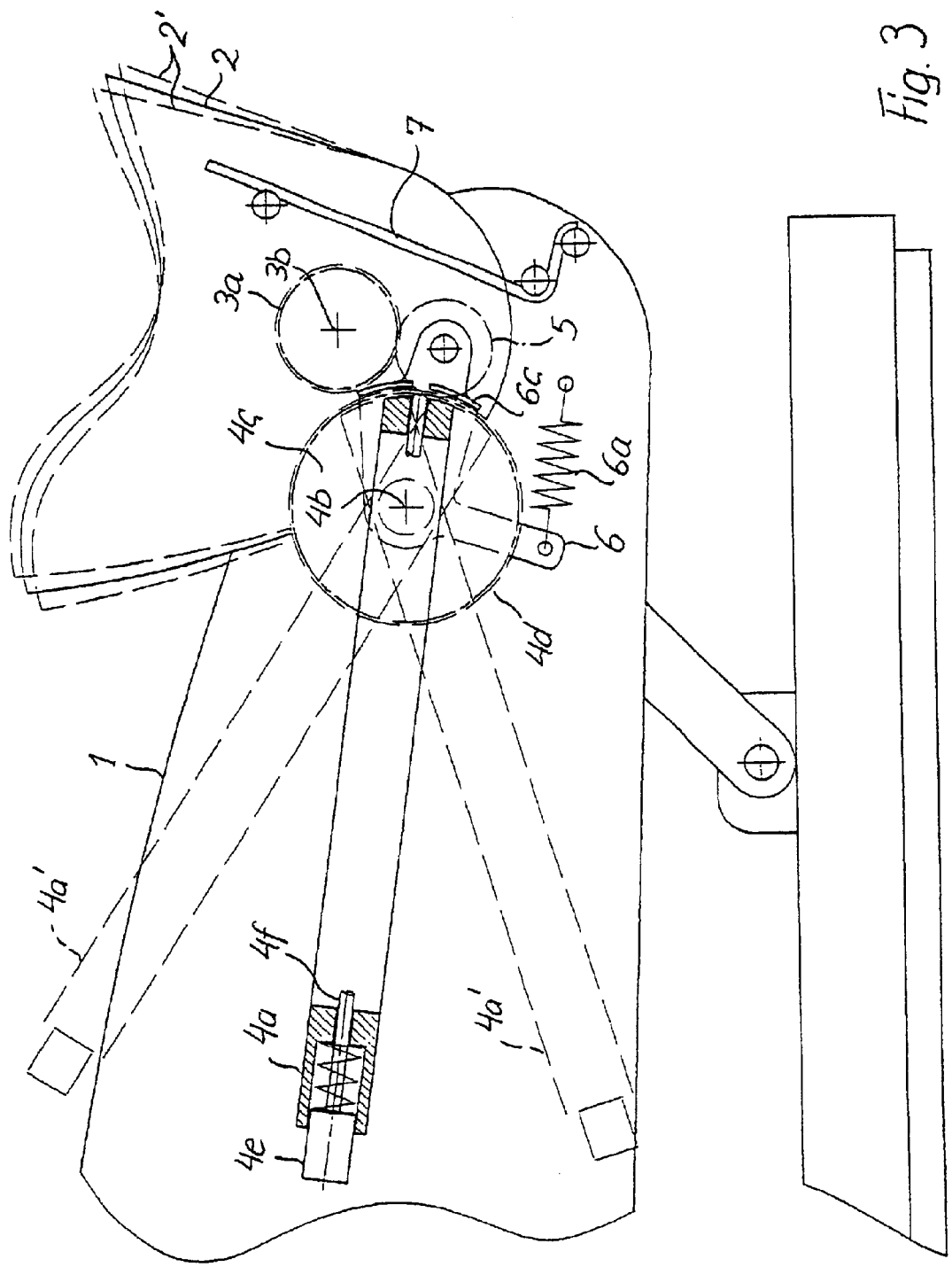
FIG. 3 is the view as shown in FIG. 2 illustrating the adjustment mechanism and actuation device areas.

The swiveling lever 4a may be displaced upward or downward from its neutral position as far as the positions shown by dotted lines in FIG. 3 and designated as 4a'. Displacement of the swiveling lever 4a either upward or downward from its central position causes rotation of the drive take-off gear 4d that is converted into a stepped adjustment of the seat back 2 by means of the intermediate gear 5 and the drive gear 3a mounted on the tilt axis 3b. Upon multiple actuations of the swiveling lever 4a upward or downward from the central position, the tilt of the seat back 2 may be altered, for example, through the tilt range designated by 2'.

Figure 4:
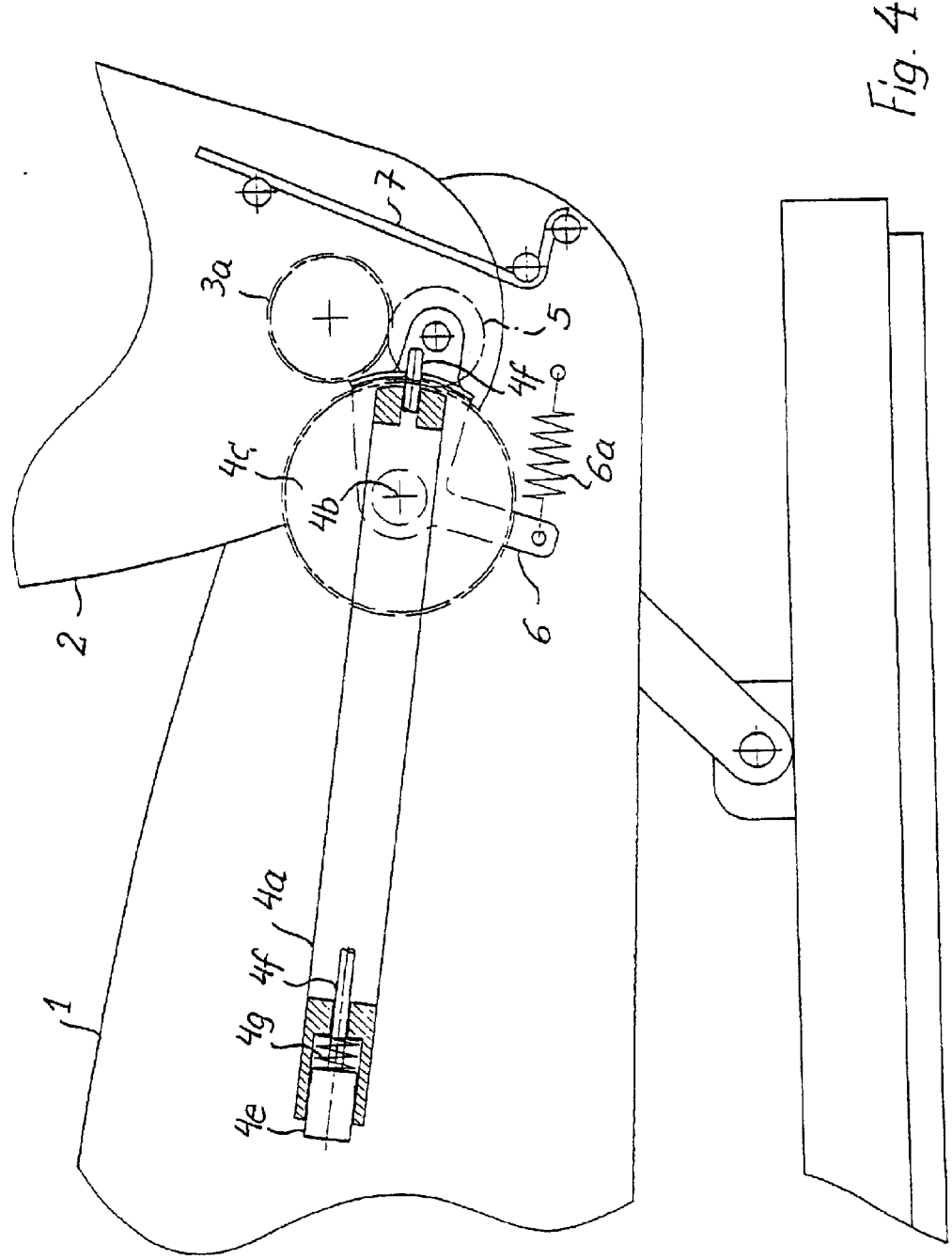
FIG. 4 is a side view as in FIG. 2 with the coupled swiveling lever used to release the rotating connection between the adjustment mechanism and actuation device.

When the seat back 2 is to be adjusted through a greater tilt angle than that shown in FIG. 3, the actuation button 4e is pressed into the neutral central position of the swiveling lever 4a, as shown in FIG. 4. The linkage rod 4f then penetrates the aperture 6b in the swing lever 6.

Figure 5:
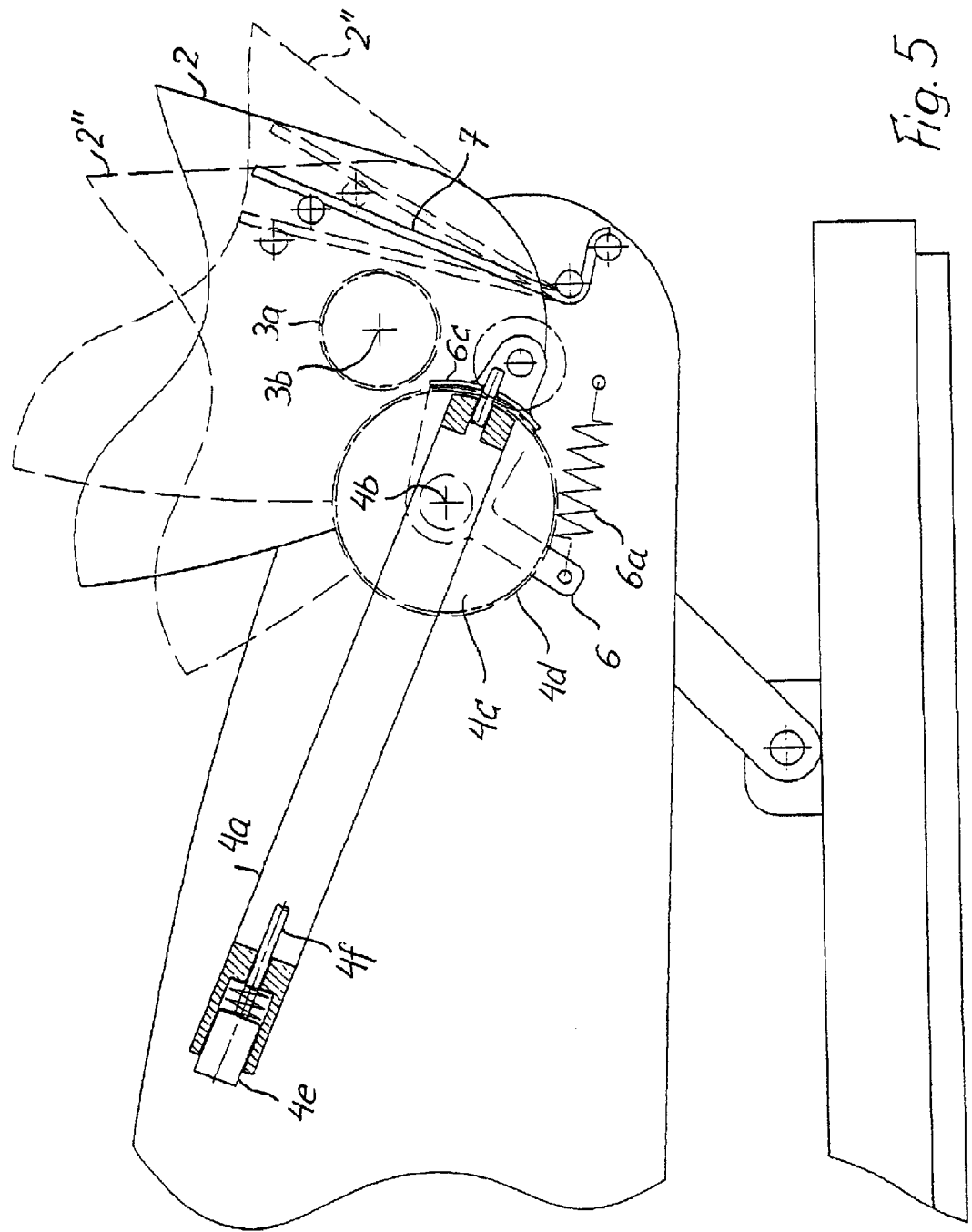
FIG. 5 is a side view s in FIG. 2 with the rotating connection in the released position.

When the swiveling lever 4a is raised while the actuation button 4e is depressed, the swing lever 6 rotates about the axis 4b, and the intermediate gear 5 is displaced away from the drive gear 3a. The drive gear 3a is thus free to rotate. This causes the spring 7 to move the seat back in a forward direction and to press the seat back 2 against the back of the seat occupant, if present. The seat back 2 can then be roughly manually adjusted (by the seat occupant, for example) into the position designated with 2" in FIG. 5, as is normal with a raster adjustment mechanism.

After the intermediate gear 5 is engaged with the drive gear 3a, the now present tilt position of the seat back is locked by the stepped switching mechanism 4c. In any of these tilt positions of the seat back 2, fine adjustment of the tilt of the seat back is possible by means of the stepped switching mechanism 4c as previously described.

Although the present invention has been explained utilizing an automobile type seat, this is for exemplary purposes only and not a limitation of the present invention which can be implemented in any type of seat.

Modifications and substitutions by one of ordinary skill in the art are considered to be within the scope of the present invention that is not to be limited except by the claims which follow.

What is claimed is:

1. A device to actuate a drive gear of an adjustment mechanism of a seat with a stepped switching mechanism manually operable in two directions by means of a swiveling lever that is rotationally connected with said drive gear in order to rotate it, comprising:

a release mechanism providing a releasable rotational connection between said stepped switching mechanism and said drive gear such that when said release mechanism is activated, said drive gear is not in contact with any other gears and may rotate freely about a horizontal tilt axis.

2. The device as in claim 1, wherein said stepped switching mechanism is rotationally connected with said drive gear via an intermediate gear, and wherein said intermediate gear may be displaced and thus disengaged from contact with said drive gear.

3. The device as in claim 1, wherein said swiveling lever includes a linkage device serving as said release mechanism and operable to release said rotational connection between said stepped switching mechanism and said drive gear.

4. The device as in claim 2, wherein said intermediate gear is mounted free to rotate about a fixed axis.

5. The device as in claim 4, wherein said fixed axis coincides with said rotational axis of said swiveling lever.

6. The device as in claim 2, wherein said intermediate gear is mounted on a swing lever that is pre-tensioned by a spring urging said intermediate gear in engagement with said drive gear, and wherein said intermediate gear may be releasably coupled to said swiveling lever by means of said release mechanism.

7. The device as in claim 1, wherein said drive gear is a part of a tilt adjustment mechanism for a seat back, and wherein said seat back is pre-tensioned in a first direction by a spring.

8. The device as in claim 1, wherein said drive gear is part of a reducing transmission.

9. An adjustment mechanism to rotate a seat back relative to a seat body about a horizontal tilt axis having a first position wherein said seat back may be rotated about said horizontal tilt axis and a second position wherein said seat back may rotate freely about said horizontal tilt axis, said adjustment mechanism comprising:

a swing lever rotatably secured about a rotation axis to said seat body;

a first gear rotatably mounted to said seat back;

a second gear rotatably disposed about said rotation axis;

a third gear rotatably disposed about said swing lever, said third gear in constant communication with said second gear;

a swivel lever in communication with second gear; and an engagement mechanism operable between a first and a second position, whereby in said first position, said first, said second and said third gear are in communication with each other such that when said swivel lever is rotated in a first or a second direction, said seat back rotates in a first and a second direction respectively, and whereby in said second position, said engagement mechanism is in communication with said swivel lever such that when said swivel lever is rotated, said third gear is not in communication with said first gear and said seat back is freely rotatable about said horizontal tilt axis.

10. The adjustment mechanism as claimed in claim 9 wherein said engagement mechanism further comprises a linkage rod wherein said linkage rod engages said swing lever such that when said swivel lever is rotated, said third gear is rotated and brought out of communication with said first gear.

11. The adjustment mechanism as claimed in claim 10 wherein said swing lever further includes an aperture sized and shaped to engage at least a portion of said linkage rod.

12. The adjustment mechanism as claimed in claim 11 wherein said engagement mechanism further includes a button disposed on said swivel lever in communication with said linkage rod.

13. The adjustment mechanism as claimed in claim 9 further including a biasing mechanism, said biasing mechanism biasing said swivel lever in said first position.

14. A seat mechanism to rotate a seat back relative to a seat body about a horizontal tilt axis comprising:

a plurality of gears having a drive gear, the plurality of gears adapted to be in communication with each other;

a swivel lever in communication with at least one of said gears; and an engagement mechanism in communication with said swivel lever such that when said swivel lever is rotated, said drive gear is not in communication with any of the other of said plurality of gears and whereby said seat back is freely rotatable about said horizontal tilt axis.

15. The seat mechanism as claimed in claim 14 wherein said plurality of gears further includes:

a swing lever rotatably secured about a rotation axis to said seat body;

a first gear as the drive gear and rotatably mounted to said seat back;

a second gear rotatably disposed about said rotation axis;

a third gear rotatably disposed about said swing lever, said third gear in constant communication with said second gear; and a swivel lever in communication with said second gear.

16. The seat mechanism as claimed in claim 15 wherein said engagement mechanism further comprises a linkage rod wherein said linkage rod engages said swing lever such that when said swivel lever is rotated, said third gear is not in communication with said first gear.

17. The seat mechanism as claimed in claim 16 wherein said swing lever further includes an aperture sized and shaped to engage at least a portion of said linkage rod.

18. The adjustment mechanism as claimed in claim 17 wherein said engagement mechanism further includes a button disposed on said swivel lever in communication with said linkage rod.

19. The adjustment mechanism as claimed in claim 17 further including a biasing mechanism, said biasing mechanism biasing said swivel lever in said first position.

* * * * *